Figure 1:
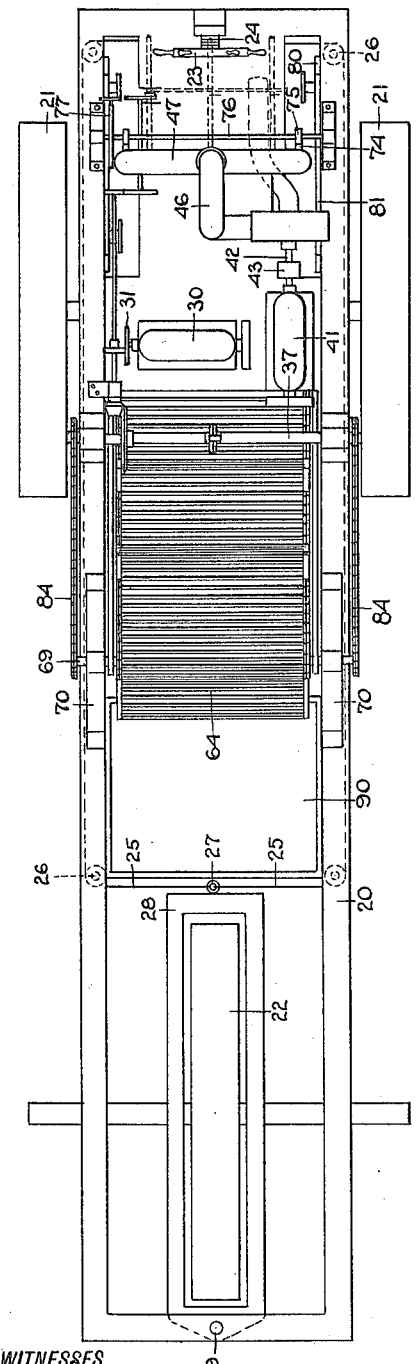

L. R. GAGE.
CLAM DIGGER AND FISHING MACHINE.
APPLICATION FILED MAR. 19, 1915.

1,164,492.

Patented Dec. 14, 1915.
5 SHEETS—SHEET 1.

WITNESSES
F. D. Sweet
Geo. D. Beeler

INVENTOR
Lorenzo R. Gage
BY Munn & Co
ATTORNEYS

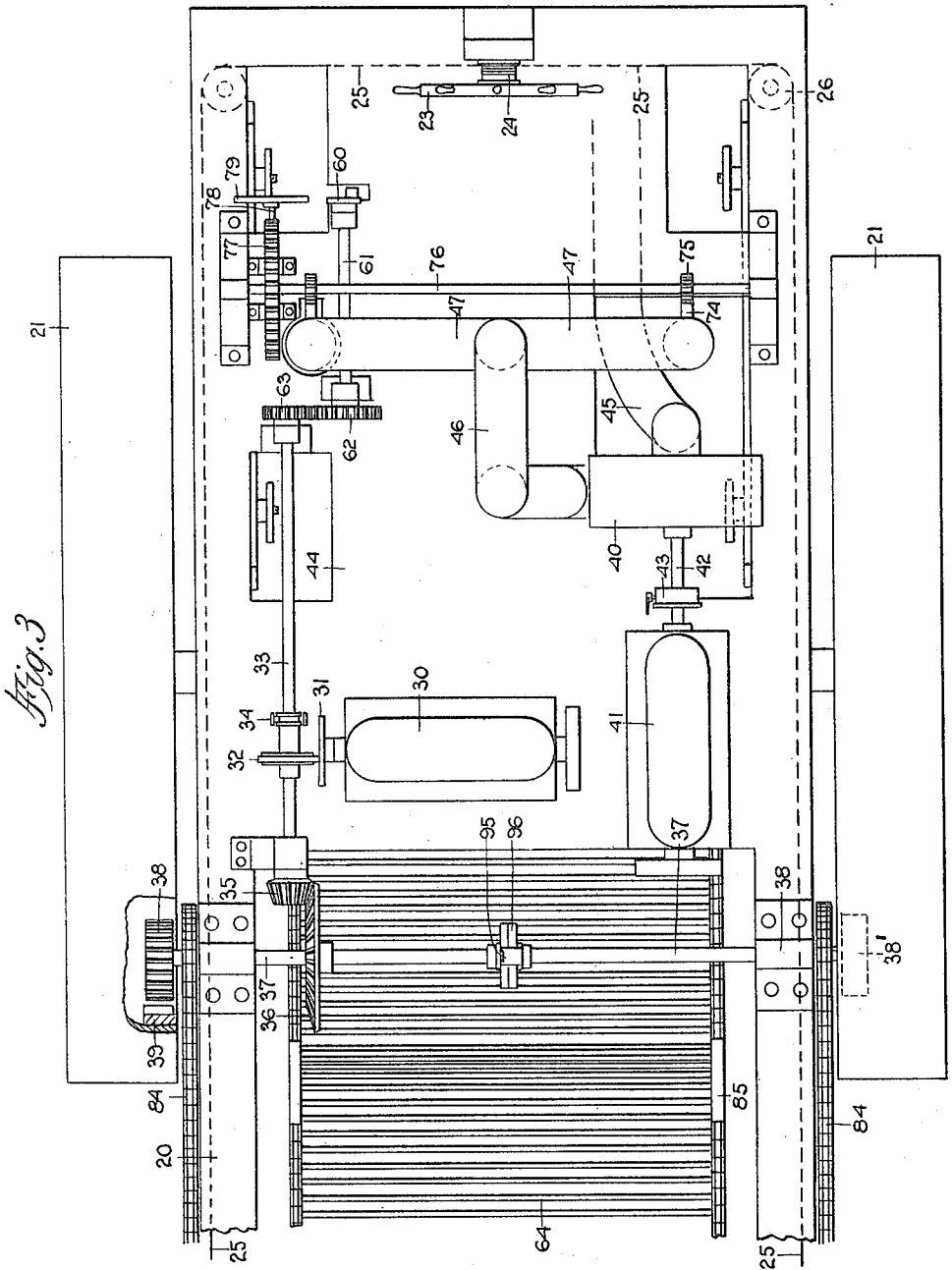

L. R. GAGE.
CLAM DIGGER AND FISHING MACHINE.
APPLICATION FILED MAR. 19, 1915.
1,164,492.
Patented Dec. 14, 1915.
5 SHEETS—SHEET 3.
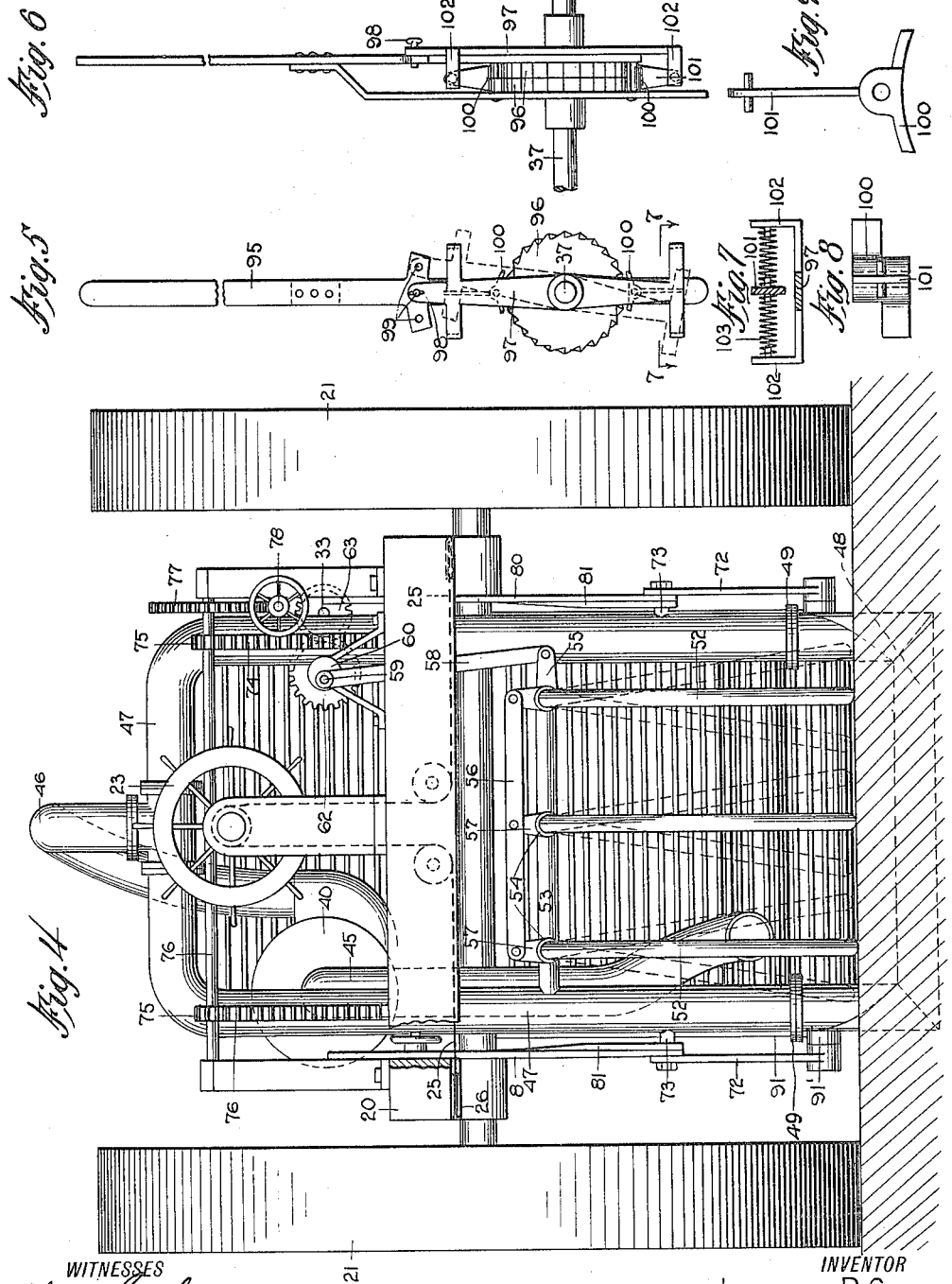
INVENTOR
Lorenzo R. Gage L. R. GAGE.
CLAM DIGGER AND FISHING MACHINE.
APPLICATION FILED MAR. 19, 1915.
1,164,492.
Patented Dec. 14, 1915.
5 SHEETS—SHEET 4.
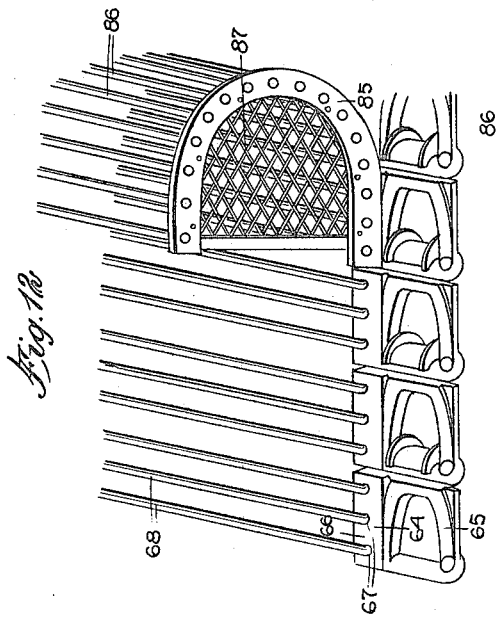
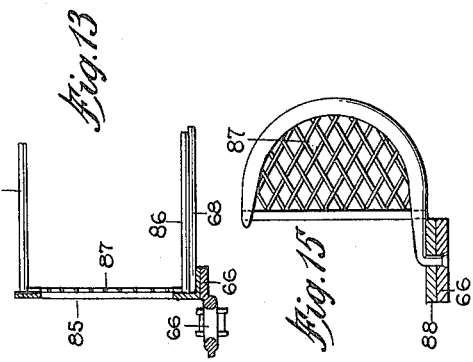
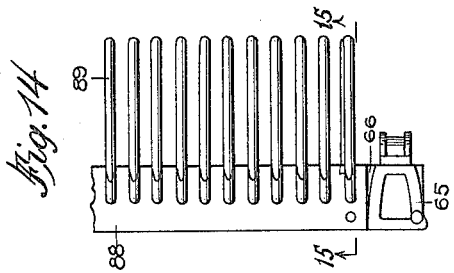
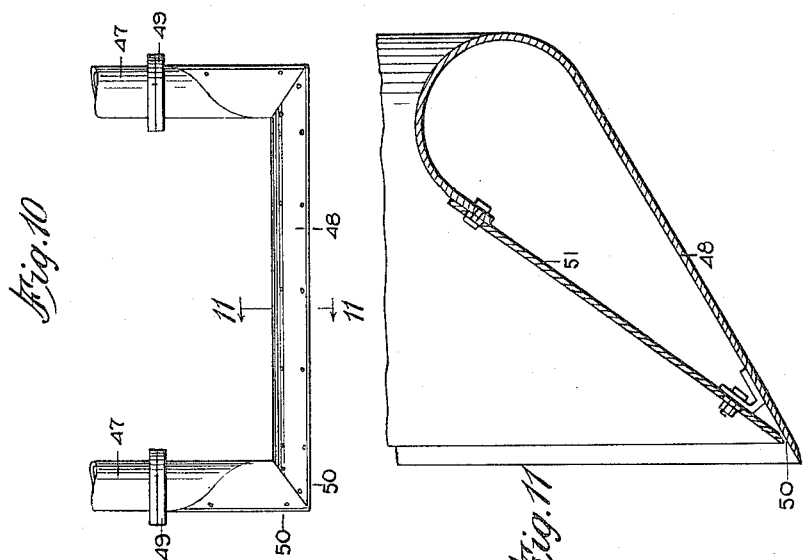
WITNESSES
INVENTOR
Lorenzo R. Gage
BY
ATTORNEYS

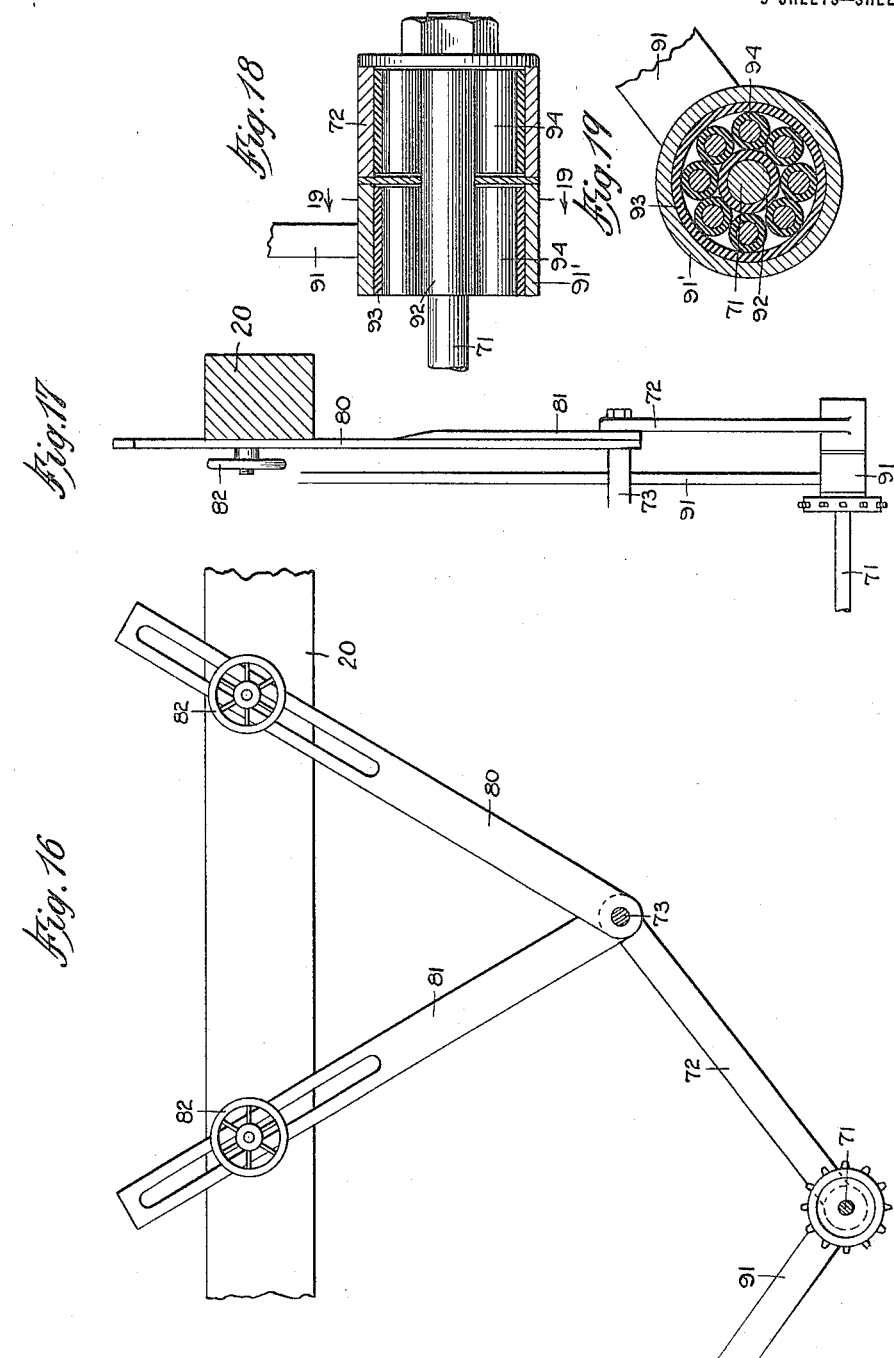

UNITED STATES PATENT OFFICE.

LORENZO R. GAGE, OF HOQUIAM, WASHINGTON.

CLAM-DIGGER AND FISHING-MACHINE.

1,164,492. Specification of Letters Patent. Patented Dec. 14, 1915.

Application filed March 19, 1915. Serial No. 15,446.

*To all whom it may concern:*

Be it known that I, LORENZO R. GAGE, a citizen of the United States, and a resident of Hoquiam, in the county of Chehalis and State of Washington, have invented a new and Improved Clam-Digger and Fishing-Machine, of which the following is a full, clear, and exact description.

This invention relates to machines for gathering clams, oysters or other shellfish, from beds of sand, gravel or the like along bodies of streams or other bodies of water, and has particular reference to devices movable or transportable along the water either upon the bed of the water or otherwise and including means for loosening the sand or gravel to free the clams, and also being provided with means for elevating the clams and separating them from the sand or gravel while the machine is being transported.

The term sand as used hereinafter should be interpreted as broad enough to cover mud, shale, gravel or any other loose pliable material of which the bed of a stream or sea may be composed, and likewise the term clams as employed in this specification is to be understood as being applicable to any kind of shellfish or mollusk adapted to be gathered by the use of this machine.

Among the objects of the invention is to provide a peculiar construction of dredging apparatus with means for adjusting the same vertically with respect to the supporting frame and having associated therewith an endless carrier or elevator for gathering and delivering the clams loosened from the sand by said dredging devices.

The foregoing and many other objects of the invention will hereinafter be more fully described and claimed and illustrated in the drawings forming a part of this specification in which like characters of reference indicate corresponding parts in all the views, and in which—

Figure 2:
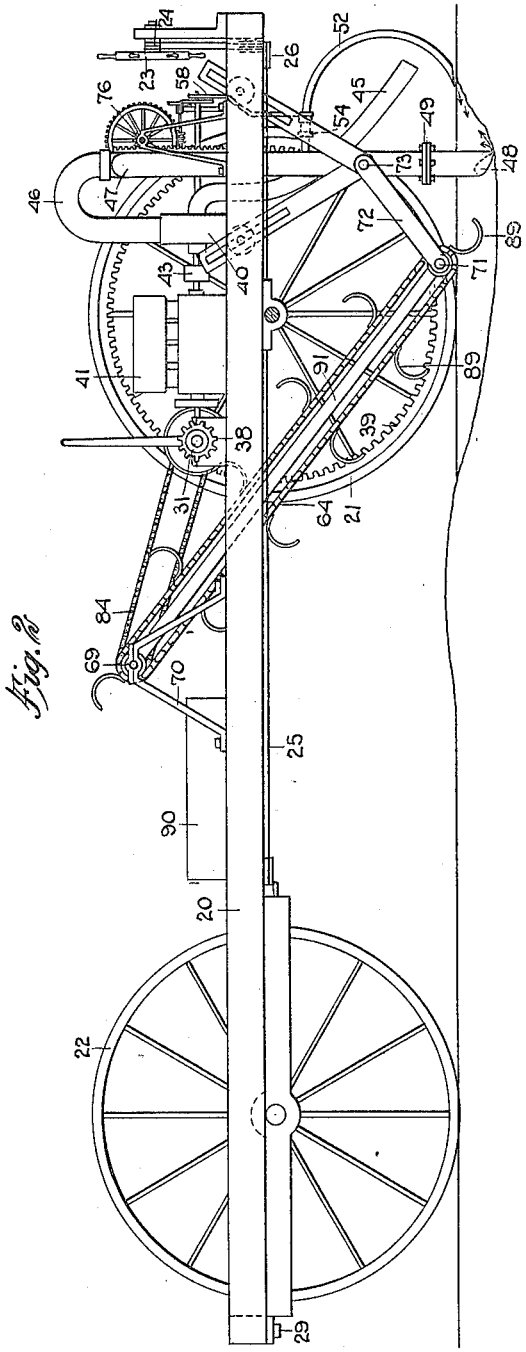

Figure 1 is a plan view; Fig. 2 is a side elevation; Fig. 3 is an enlarged plan view of the front end of the machine; Fig. 4 is a front elevation; Figs. 5 and 6 are front and side elevations respectively of certain hand lever devices associated with the driving shaft; Fig. 7 is a transverse section on the line 7—7 of Fig. 5; Figs. 8 and 9 are plan and side elevations of one of the pawls used in connection with the lever; Fig. 10 is a front elevation of the lower end of the dredger yoke; Fig. 11 is a sectional detail on the line 11—11 of Fig. 10; Fig. 12 is a portion of the elevator structure showing the form of bucket used in operating in gravel; Fig. 13 is a sectional detail on the line 13—13 of Fig. 12; Fig. 14 is a plan view of a portion of the carrier used in connection with sand; Fig. 15 is a sectional detail on the line 15—15 of Fig. 14; Figs. 16 and 17 are side and edge views of the dredger adjusting mechanism; Fig. 18 is a detail view of a novel form of roller bearing used in the lower end of the elevator; and Fig. 19 is a sectional view on the line 19—19 of Fig 18.

The several parts of this device may be made of any suitable materials, and the relative sizes and proportions, as well as the general design of the mechanism, may be varied to a considerable extent without departing from the spirit of the invention hereinafter more fully described and claimed.

At 20 I show any suitable form or design of main supporting frame adapted to be supported and propelled along a body of water by any suitable means, either upon the water itself or upon the bed of the water, the means shown herein for such purpose including a set of wheels 21 and 22, the wheels 21 being shown as the traction wheels and the wheel 22 being a steering wheel. Obviously, the principal part of the invention does not depend upon any special supporting and propelling devices. The illustration typifies, however, a form of machine which I have found to be highly efficient and satisfactory in practice. The steering mechanism includes a hand wheel 23 having a drum 24 journaled at the front end of the machine with its axis parallel to the longer axis of the machine, and from which drum extend in opposite directions a pair of cables 25 which lead over any suitable number or location of direction pulleys 26 back to a point 27 where they are connected to the front end of a frame 28 which determines the direction of the steering wheel 22. Said frame 28 is shown pivotally connected at 29 in the rear end of the frame 20. Upon rotation of the drum 24 in either direction one of the ropes 25 will be wound up and the other paid out an equal amount, thereby causing the frame 28 to move laterally around the pivot 29.

As a suitable means to propel the machine through the traction wheels 21, I provide an engine 30 to the shaft of which is connected a friction disk 31 with which coöperates a friction wheel 32 slidable along a longitudinal shaft 33. The position, and hence the direction and rate of speed of the wheel 32, is determined by means of a shifting yoke 34. The shaft 33 has connected to its rear end a pinion 35 meshing with and driving a bevel gear 36 on a power shaft 37, which is journaled at 38' on the side bars of the frame 20, and has on its ends a pair of toothed wheels or pinions 38 meshing with circular racks 39 formed on the rims of the wheels 21. It will thus be seen that the machine may be driven either forward or backward and at any desired speed within the limit of the design of the mechanism by operation of the engine 30 and adjustment of the wheel 32.

At 40 is shown a rotary pump operated by a motor 41 connected thereto by a shaft 42 through a clutch 43. This pump is carried upon a platform 44 at the front end of the machine in substantially fixed position and receives water through the intake pipe 45 from in front of the machine and delivers the same through a flexible outlet 46 into a substantially U-shaped yoke or standpipe 47 shown best in Fig. 4. This member or standpipe includes vertical parallel legs on opposite sides of the center of the machine to the lower ends of which is connected a peculiar type of plow or dredging nozzle 48 including a straight horizontal member and upwardly extending end members connected at 49 through flanged couplings to the legs 47. This part of the structure is shown best in Figs. 10 and 11 and provides a substantially continuous slot 50 extending not only across the front edge of the horizontal portion of the plow but also along the end members. The dredging nozzle, as shown in Fig. 11, includes an adjustable plate 51 connected by bolts and slots to the main portion thereof, the adjustment providing for variations in width of the slot to vary the ejector effect thereof. Said plate 51 furthermore may be removable, as well as being adjustable, for the purpose of repair or cleaning of the device. The slotted portion of the plow or dredger nozzle practically outlines the scope of digging operation of the machine as the machine is propelled along its course. The water under pressure from the pump 40 is delivered through the standpipe 47, a portion of the water being jetted from the plow slot 50, loosening up the bed of sand to the desired depth and hence setting the clams therein substantially free, and such loose sand and clams are delivered between the legs of the standpipe and over the horizontal portion of the plow 48. Such delivery is facilitated by a series of movable nozzles 52 extending forwardly at their upper ends from a pipe 53 communicating with the legs 47 of the standpipe. These nozzles 52 are connected by movable joints 54 to the transverse pipe 53 around which they are adapted to oscillate laterally as shown by full and dotted lines in Fig. 4, such movement being around a horizontal axis parallel to the direction of movement of the machine. Each of these nozzles extends forwardly and downwardly, terminating in an open end directed rearwardly at or about the upper surface of the bed of sand. That portion of the water under pressure from the point of delivery through the nozzles 52 serves to drive the sand and clams over the plow 48.

Any suitable means may be provided to cause the oscillation of the nozzles 52 while the machine is in operation. For this purpose I provide a bell crank 55 connected to one of the nozzles, one arm of which is connected by a link 56 to cranks 57 of the other two nozzles and the other arm of the bell crank is connected by a link 58 to the wrist pin 59 of a crank disk 60 on the front end of the shaft 61 journaled upon the platform 44. A gear wheel 62 meshes with another gear wheel 63 whereby the shaft 61 is driven from the engine shaft 33.

At 64 I show an endless elevator comprising in the main a pair of chains 65 preferably of the separable link type, each link having an inwardly projecting wing 66 with a series of perforations 67 through which any suitable number of cross bars 68 are connected, forming the device into a slotted belt. The upper end of this carrier or elevator is mounted upon a shaft 69 journaled in fixed supports 70 on the sides of the frame, and the lower end of the elevator is journaled upon a shaft 71 whose position or elevation is determined by a pair of links 72 pivoted at 73 upon the outer sides of the standpipe legs 47. The lower end of the elevator thus has a substantially fixed relation to the plow or dredging nozzles 48, but these parts are all adjustable vertically simultaneously by means of racks 74 and pinions 75. The racks are connected to the legs 47, preferably on their front faces, and the pinions are carried by a shaft 76 to which is connected a worm wheel 77 operated by a worm on a shaft 78 operated by a hand wheel 79. The worm and worm wheel provide a means for easily manipulating the standpipe and also constitute a self-locking means therefor. A pair of braces 80 and 81 are connected upon each pivot pin 73 and have slotted connection at their upper ends with hand clamps 82 whereby the standpipe is well braced in both directions in any position to which it may be adjusted.

Any suitable means may be provided to drive the endless carrier 64. The means shown herein for this purpose includes a pair of sprocket chains 84 connecting the shaft 69 with the driving shaft 37, whereby the carrier is operated with its upper run moving rearwardly.

At suitable intervals along the outside of the endless carrier are arranged baskets or buckets which may vary somewhat in specific form according to the material acted upon. For operating in gravel or the like the buckets are made as shown in Figs. 12 and 13, each having an arc-shaped end piece 85 with its open end or side upward on the ascending run of the belt, and between the end pieces are a series of rods 86 between which the water and gravel may flow freely, but leaving the clams within the bucket. The clams are prevented from spilling or washing out of the ends of the buckets by means of any suitable reticulated means 87.

For acting upon the sand the carrier includes a series of cross bars 88 each carrying a series of spaced hooks 89 of the character and form shown in Figs. 14 and 15 forming a bucket for substantially the same purposes as above described. Referring again to Fig. 2, it will be seen that the said buckets will scoop into the mass of sand and clams previously loosened by the dredging devices and will lift and carry the same, separating the clams from the sand and dumping the clams over the top of the elevator into a hopper 90.

In order to prevent to a large extent the abrasive action of the sand upon the bearings at the lower end of the elevator frame 91, I use preferably that type of bearing shown in Figs. 18 and 19, in which all surfaces having rolling frictional contact are made of rubber. In other words, a sleeve 92 is slipped upon the shaft 71 and surrounding and spaced from the same is a hub 91' connected to a portion of the frame 91 and lined with a sleeve 93.

94 indicates a series of cylindrical bearings each having a metal core and a rubber sleeve surrounding the same.

In the event of failure or incapacity of the engine 30 to drive the machine from or along the water, it may be necessary to resort to some auxiliary driving means so as to bring the machine to a safe landing. A suitable means for this purpose is illustrated in Figs. 5 to 9 inclusive, the same including a hand lever 95 pivoted upon the shaft 37 and associated with a peculiar form of pawl and ratchet mechanism including a double ratchet wheel 96 having two series of teeth extending in opposite directions. An arm 97 is likewise pivoted upon the shaft 37 parallel to a portion of the lever 95 but independent thereof. Said arm 97 is adapted to be connected by means of a pin 98 in any one of a series of three holes 99 formed in the lever.

100 indicates a peculiar form of pawl pivoted to the lever on either side of the wheel 96, each of said pawls having a finger 101 extending loosely between a pair of lugs 102 extending laterally from each end of the arm 97, springs 103 providing a resilient connection between said lugs and said finger 101. When the pin 98 is in the middle hole 99, the pawls will be held neutral and the lever 95 will be inoperative, but when the pin is engaged in either of the end holes of the series, the arm and lever will be set at an angle to each other as shown in dotted lines in Fig. 5, which will cause the pawls 100 to engage with one or the other of the series of teeth of the ratchet wheel 96. Each pawl has two points offset from each other in parallel planes so as to engage with one or the other of the series of teeth of the ratchet wheel depending upon which hole 99 is engaged by said pin whereby the direction of movement of the shaft 37 will be determined when the lever is oscillated around the axis of the shaft 37. By oscillating the lever 95, therefore, around the shaft 37, said shaft may be caused to be rotated in either direction for the purpose of propelling the machine at a slow speed.

I claim:

1. In a machine of the nature set forth, the combination of an endless elevator, means supporting the upper portion of the elevator for movement around a fixed axis, a hydraulic dredging device spaced ahead of the elevator, means spanning the space and pivotally connecting the lower end of said elevator to said dredging device, and means for adjusting said dredging device vertically and simultaneously elevating, through said pivotal connections, the lower end of the elevator simultaneously.

2. In a clam digging machine, the combination of an endless elevator, a vertically adjustable hydraulic dredging device operating in front of and in spaced relation to the elevator, and a pair of links pivotally connecting one end of the elevator to the dredging device.

3. In a clam digging machine, the combination of a main frame, means for supporting and propelling said frame, an endless elevator having one end mounted upon a fixed axis on said frame, a hydraulic dredging device including a substantially vertical standpipe with a dredging nozzle spaced in front of the elevator, a pair of link connections between the elevator and the standpipe, and means for operating the dredging device and elevator simultaneously with the movement of the frame.

4. In a clam digging machine, the combination of a main frame, means for supporting and propelling said frame in any desired direction along a body of water, dredging devices carried by the front end of the machine and including a substantially U-shaped standpipe having parallel legs, means to force water under pressure into and through said legs, a plow nozzle comprising a substantially horizontal member and upwardly projecting members connected to the lower ends of the legs, said nozzle providing an open slot extending into and operating upon the body of sand, and means to gather clams loosened from the sand by said dredging devices.

5. In a clam digging machine, the combination of a frame, means for supporting and propelling the frame along a body of water over a bed of sand, a dredging device carried by the frame and including a standpipe, a plow nozzle carried by the standpipe and projecting into the sand to loosen the same by hydraulic action, auxiliary nozzles connected to the standpipe and receiving water under pressure therefrom, said auxiliary nozzles being arranged in front of the standpipe and having their mouths directed rearwardly, and means to oscillate the auxiliary nozzles laterally while in action.

6. In a clam digging machine, the combination of a main frame, means for supporting and propelling the same in any direction along a body of water, hydraulic dredging devices carried by the frame, said dredging devices including a standpipe, a horizontal plow nozzle connected to and carried by the standpipe and serving to loosen up a bed of sand, an elevator for acting in and through the loose sand to separate therefrom the clams, and a series of movable nozzles connected to the standpipe and extending therefrom forwardly and thence downwardly and toward the elevating device, the action of the nozzles being directed over the line of action of the plow nozzle.

7. In a clam digging machine, the combination of a main frame, means for supporting and propelling the same, a dredging device including a substantially vertical standpipe, a plurality of diagonally arranged braces serving to support the standpipe at any desired elevation upon said frame, means supported on the frame for forcing water under pressure through said standpipe, nozzle mechanism carried by the standpipe and serving to loosen up a bed of sand and direct the same rearwardly, and elevating devices pivotally connected to the standpipe and acting in the rear thereof to lift the clams loosened from the sand.

8. In a clam digging machine, the combination of a main frame, means for supporting and propelling the same, hydraulic dredging devices carried by the frame and extending thence downwardly into a bed of sand, said dredging devices including a horizontally disposed nozzle member having a narrow slot adjacent its front edge and also including nozzle devices acting above said horizontal nozzle member and serving to force the loose sand rearwardly thereover, and means carried by the frame to operate the nozzle devices.

9. In a clam digging machine, the combination of a main frame, means to support and propel the same, dredging devices carried by the frame and extending thence downwardly into a bed of sand, said dredging devices including a plow nozzle having a horizontal slot along its front edge and having side members with vertical slots constituting continuations of the horizontal slot and defining therewith the width and depth of the cut along the sand, elevating devices for the clams loosened from the sand, and means serving to force the sand and clams rearwardly over the plow nozzle toward the elevating devices.

10. In a clam digging machine, the combination of a standpipe, means to force fluid under pressure therethrough, a plow nozzle connected to the lower end of the standpipe and acting in and through a body of sand to loosen the same, a series of auxiliary nozzles connected to the standpipe and extending forwardly therefrom in horizontal parallel lines and bent thence downwardly and rearwardly with their open ends directed over the plow nozzle, and means to oscillate said auxiliary nozzles laterally in arcs of circles around said parallel lines.

11. In a clam digging machine, the combination of a main frame, means to propel the same, dredging devices carried by the frame, said dredging devices including a standpipe, a plow nozzle connected thereto and acting in and through a body of sand and also including auxiliary nozzle means extending forwardly from the standpipe and directed thence downwardly and rearwardly over the plow nozzle, and means to oscillate the auxiliary nozzle means laterally, and means acting through the loose sand to gather the clams therefrom.

12. In a clam digging machine, the combination of a main frame, means to propel the said frame along a body of water, dredging devices including a standpipe having two spaced legs, means to force water under pressure through said legs, a plow nozzle connected to the lower ends of said legs and serving to operate in and through a body of sand to loosen the same, and a series of auxiliary nozzles extending forwardly from the standpipe in parallel lines, said auxiliary nozzles turning thence downwardly and rearwardly to force the loosened sand over the plow nozzle, and means connected to all of said auxiliary nozzles to cause simultaneous oscillation thereof around said parallel lines, the oscillating means for the auxiliary nozzles being mounted upon said frame and driven from the means for propelling the frame.

In testimony whereof I have signed my name to this specification in the presence of two subscribing witnesses.

LORENZO R. GAGE.

Witnesses:
GEORGE CROSTON,
C. W. HODGDON.

Copies of this patent may be obtained for five cents each, by addressing the "Commissioner of Patents, Washington, D. C."